2,890,442

FAILURE WARNING SYSTEMS FOR NAVIGATIONAL APPARATUS

Arthur Philip Glenny, Hanworth, and Frank Dove, St. Albans, England, assignors, by mesne assignments, to The Sperry Gyroscope Company, Limited, Brentford, England, a company of Great Britain Application May 12, 1952, Serial No. 287,348

Claims priority, application Great Britain May 11, 1951

2 Claims. (Cl. 340—253)

The present invention relates to apparatus for use in the navigation of mobile craft of the kind in which a control quantity or signal representing information useful in the navigation of the craft is derived, and transmitted through a signal channel to utilisation means where it is used to exercise a control action. Such apparatus falls in general into two classes: automatic control apparatus and visual instrumental aids to navigation. In apparatus of the first of these classes, the control quantity is applied to control the operation of power apparatus to exert a control action effective to alter the attitude, speed, or path of travel, of the craft, and thereby realise an automatic control system for the craft. In apparatus of the second class the control quantity is applied to control the displacement of an index in an indicating instrument, which displacement thereby conveys visual information to the pilot or navigator of the craft, enabling him to control the attitude, speed, or path of travel, of the craft to navigate it in a desired manner.

In either case, the information represented by the control quantity is in general information concerning a characteristic of the craft's position or motion: thus it may be information concerning the craft's attitude, direction of motion, or speed, or concerning its direction, distance, or position, with respect to some external point, object, or surface. Alternatively, the information represented by the control quantity may be compounded out of a number of items of information of this kind: thus, in one known apparatus of this kind for assisting in the control of aircraft the control quantity is the algebraic sum of three quantities, one proportional to the aircraft's distance from a track to be followed, defined by external radio guidebeam transmitters, another proportional to the angular departure of the aircraft's heading from a direction identical with the direction of the said track, while the third is proportional to the angle of bank of the aircraft.

In general, the control quantity is used either by automatic control apparatus or by the pilot to initiate some kind of control action: e.g. in the case of control of aircraft, to operate a control surface of the aircraft to bank the aircraft. Since the control action is usually a correcting action to correct a deviation of the craft from a desired condition of travel, and since this correcting action may be initiated in either sense according as the deviation is in one sense or the other from the desired condition of travel, e.g. deviation of an aircraft in one sense or the other from a path that it is desired that the aircraft should follow, and since no correcting action is required if the desired condition is actually obtaining, it is usual for the control quantity to be zero when the desired condition of flight obtains and for it to depart from zero in one sense or the other according as the aircraft departs in one sense and/or the other from the desired condition of flight. The invention is specifically concerned with apparatus of this kind. Apparatus of this kind includes, in particular, apparatus in which the control quantity is used to deflect an indicator that is normally in the centre of its range of movement when the desired condition of flight is obtained, and which is deflected to one side or the other by the control quantity according as the departure of the aircraft from the desired condition is in one sense or the other. Such indicators are referred to as centre-zero instruments. By analogy, apparatus of the kind specified may be referred to as centre-zero control apparatus.

A difficulty arises in the use of all such centre-zero control apparatus. This is that, if there is a failure in the system of a kind that results in the control quantity's not being transmitted through its appointed signal channel to appear where it is to exert its control action, the indication or information provided, or control action exercised, is that appropriate when the craft is being correctly controlled to maintain the desired condition of travel. In other words, the system does not discriminate between complete accuracy of control and certain kinds of complete failure.

For example, in a centre-zero indication apparatus intended to indicate zero when the aircraft is following a guide-path, failure of the control quantity to appear at the indicator may lead the pilot to believe that he is accurately on the guide-path when he is in fact a long way from it. This may be highly dangerous.

The liability of the apparatus to experience failures of the kind considered is obviously greater in apparatus in which the signal transmission channel for the control quantity is long and elaborate. In some systems, e.g. those in which the control quantity is used to exercise automatic control of the aircraft, but also in some in which the control quantity is applied solely to a visual-indication instrument, the channel may include an electronic amplifier of possibly considerable complexity, failure of any component of which may cause the channel to cease to transmit.

It is an object of the invention to provide means associated with centre-zero control apparatus to test the operation of the system continuously during operation of the apparatus to provide an indication whether the signal transmission channel for the control quantity is operating correctly, or to provide an immediate warning if the transmission channel should fail to transmit signals.

According to the invention there is provided in association with centre-zero control apparatus means for continuously injecting into the signal transmission channel in which the control-quantity is transmitted a predetermined auxiliary test signal together with the control signal, this test signal being adapted to be transmitted along with the control signal through the signal transmission channel, and yet to be separable or distinguishable from the control signal after passing through the channel, in combination with indicating or control aparatus adapted to receive the combination of control signal and test signal and to produce therefrom two control or indication effects one distinctively due to the control signal and the other distinctively due to the test signal, the latter adapted to serve as an indication of operativeness of the signal transmission channel, so that absence of the said effect may serve as, or to provide, a warning that the signal transmission channel has ceased to operate.

Preferably the auxiliary test signal is injected into the signal transmission channel for the control quantity as near to the beginning of that channel, i.e. as near to the origin of the control quantity, as possible, and the indicator is connected to that channel as far along the channel, i.e., as near to the utilisation device as possible. In particular where the system is of the kind in which the control quantity serves to control the index of a visual indicating instrument, this instrument itself is preferably also rendered responsive to the test signal, but in a manner distinguishable from its response to the control quantity, so that it itself constitutes the test indicator.

A switch may be provided to switch the test signal on or off as desired, so that it may be continuously applied only in selected circumstances e.g., in the case of an aircraft, during a landing approach to an airfield.

The invention may be put into effect in two general methods. In the first method of realisation the control signal and the test signal are discriminated from each other by signal-selecting circuit means, the control signal being applied in one channel and the test signal in another. In this method the test signal may either operate an indicator or control a warning device, which is actuated on failure of the signal. In the second method of realisation, the control signal and the test signal are applied together to an indicator the responses of which to the control signal and to the test signal are markedly different to visual observation, and are recognisably distinct and distinguishable even when both responses are present simultaneously. Discrimination between the two signals in this method of realisation is effected visually by the observer, this being possible on account, ultimately of differences in character between the two signals and of differences in the effects of the two signals on the indicator.

In navigational apparatus in which the invention may be applied the control signal may be a D.-C. voltage whose magnitude and polarity corresponds at any instant in magnitude and polarity to the value at that instant of the control quantity that it represents, or it may be an alternating voltage at a substantially constant carrier frequency, e.g. 400 cycles per second, whose amplitude, and whose polarity with respect to a reference wave at the carrier frequency vary, in accordance with the value of the control quantity, so as to constitute a suppressed-carrier modulated carrier wave that has zero amplitude when the control quantity is zero, and that, at other instants, represents the control quantity by the instantaneous amplitude and polarity of the modulation wave envelope.

It will be appreciated that, in operation, the control quantity will be continually changing and may therefore be considered as consisting of a number of components having different frequencies within a band of operational signal frequencies. In particular, the control signals used in aircraft navigational systems may be considered as having frequencies in a range extending from 1 cycle per second to $\frac{1}{60}$ cycle per second.

Accordingly it is found convenient to use as a test signal, in the case of a system in which the control signal is a reversible-polarity D.-C. voltage, a voltage of substantially constant frequency and amplitude, the frequency being of the order of 5 to 1000 cycles per second. Similarly, in the case of a system in which the control signal is a modulated-carrier wave, the test signal may conveniently be a voltage that also has the form of a suppressed-carrier modulated carrier wave having the same carrier frequency as the control signal, but having a substantially constant modulation frequency and amplitude the modulation frequency being of the order of 5 to 1000 cycles per second.

Two embodiments of the invention will now be described with reference to the accompanying drawings in which Fig. 1 shows diagrammatically an embodiment of the invention as applied to a control system for a control surface of an aircraft.

Figure 1:
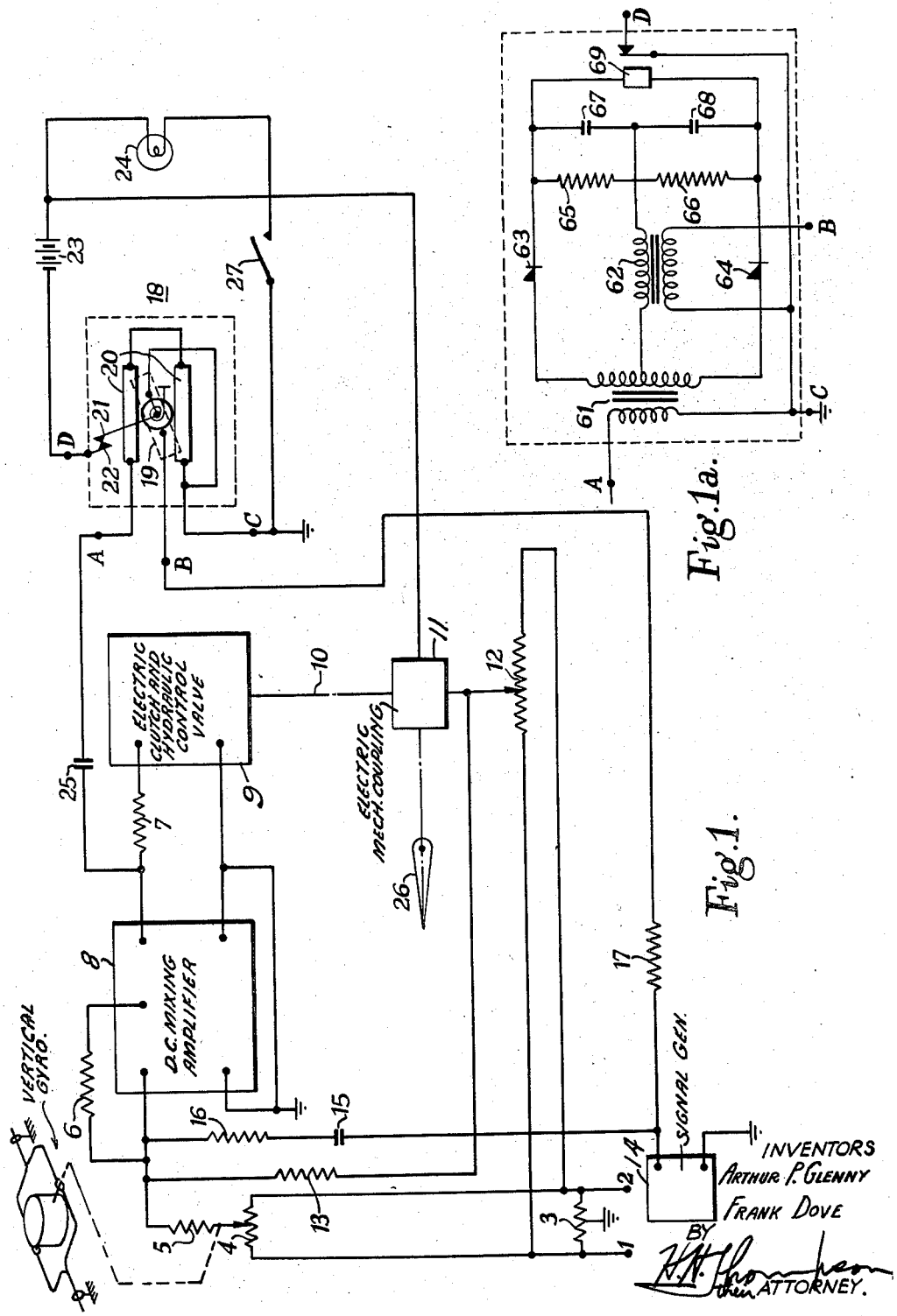
Fig. 1A shows an alternative circuit arrangement for one portion of the system of Fig. 1.

In Fig. 1 apparatus is shown diagrammatically for controlling the elevator 26 of an aircraft in response to signals from a control device 4 which may be a pick-off mounted on a gyroscope so that it gives indications of pitch of the craft. The control system shown is one in which the control signals are reversible-polarity D.C. voltages, and the control device 4 is represented as a variable potential divider connected across D.C. supply lines 1 and 2. A fixed potential divider 3 is also connected across these D.C. supply lines and its centre point is connected to earth so that the potential on the movable arm of potential divider 4 may be made either positive or negative with respect to earth. The movable arm of potential divider 4 is connected to the live input terminal of a D.C. mixing amplifier 8 through a high resistance resistor 5. The mixing amplifier 8 may conveniently be of the kind shown in United States patent application Serial No. 130,328, filed November 30, 1949, now Patent No. 2,730,573, and assigned to the assignee of the present application, and may have a negative feedback connection including the resistor 6 over its first stage, or stages, to maintain the input impedance of the amplifier at a very low value as explained in the above mentioned patent application Serial No. 130,328, now Patent No. 2,730,573. The second input terminal of amplifier 8 is connected to earth, as also is one of its output terminals. The output of the amplifier is arranged to control an electro-mechanical transducer 9 which may conveniently comprise the electro-magnetic clutch, hydraulic valve, and hydraulic motor shown in United States application Serial No. 104,862, filed July 15, 1949, now Patent No. 2,644,427, and also assigned to the assignee of the present application. Alternatively the electro-mechanical transducer 9 may be an electric motor capable of being differentially controlled. In either case the transducer is so arranged that it operates to rotate the shaft 10 at a speed dependent on the magnitude of the control signal supplied to the input terminals of the amplifier 8 and in a direction dependent on the polarity of that control signal. Shaft 10 is arranged to control the elevator 26 through a coupling arrangement 11 and also operates the movable arm of potential divider 12 connected across the supply lines 1 and 2. The potential on the movable arm of potential divider 12 is fed to the input terminal of amplifier 8 through a high resistance resistor 13, the connection being such that when the elevator 26 has moved the amount corresponding to the position of the movable arm of potential divider 4 the voltages on the movable arms of these two potential dividers are equal and opposite, so that the total input signal to amplifier 8 is zero, and movement of the elevator 26 consequently ceases.

According to the invention there is provided a signal generator 14, the output of which is connected across the input terminals of amplifier 8 through a capacitor 15 and a high-resistance resistor 16. The signal generator may be an oscillator or a pulse generator and its operating frequency may be of the order of 500 cycles per second, but satisfactory operation of the system can be obtained with any operating frequency between, say, 20 cycles and 1000 cycles per second. When a pulse generator is used, the pulses must be arranged to have equal excursions in the positive and negative directions with respect to earth, and to have equal durations during these excursions so that their integrated value over any appreciable period of time is zero. The oscillations or pulses from signal generator 14 are passed through the amplifier 8 and appear at the output terminals together with the D.C. control signal. Their frequency is arranged to be sufficiently high to have no effect on the electro-mechanical transducer 9 because of its mechanical inertia. If the characteristics of the transducer are such that it would respond to the operating frequency chosen for the signal generator 14, a capacitor may be connected across the input terminals of the transducer to prevent its responding to A.C. signals.

In the arrangement according to the invention besides being connected to the transducer 9 through resistor 7, the output of amplifier 8 is also connected to a frequency-responsive relay device 18 through a capacitor 25. In the arrangement shown this frequency-responsive device is a dynamometer relay having the output of amplifier 8 connected between terminal A and terminal C and thus across the fixed coils 20 of the relay. The output of signal generator 14 is also connected to the relay device 18 through resistor 17. As shown, it is connected between terminals B and C and thus across the moving coil 19 of the dynamometer relay. A relay of this type is operated when the fixed and moving coils are energised by two currents having a predetermined frequency and phase relationship. The arrangement shown is such that when the signals from signal generator 14 and also from the output of amplifier 8 are present together, the relay is operated and the contacts 21 and 22 are opened. The contact 21 is connected to earth, and the other contact 22 is connected to terminal D of relay device 18 and thence to one pole of a battery 23. The other pole of battery 23 is connected to a lamp or similar warning device 24, the second terminal of which is connected to earth through a switch or relay contact 27 which may be opened when the equipment is switched off. A connection may also be taken from the junction of one terminal of the battery 23 and one terminal of the lamp 24 to the coupling device 11 which may include an electromagnetic clutch arranged so as to connect the shaft 10 to the elevator 26 so long as the relay contacts 22 are open, but to disconnect the shaft and the elevator when these contacts are closed, so that in the event of failure of the amplifier 8, the elevator 26 may be operated by the manual control system without the operator having to overcome the resistance of the transducer 9. Thus, in the system shown, so long as the amplifier 8 is functioning correctly, the contacts 21 and 22 of relay device 18 are held open so that the lamp or warning device 24 is inoperative, and the shaft 10 is coupled to the elevator 26. If amplifier 8 fails, the contacts 22 of relay device 18 are closed so that warning device 24 is operated and elevator 26 is disconnected from shaft 10 to facilitate manual control.

In place of the dynamometer relay shown in relay device 18 in Fig. 1 a rectifier arrangement may be used in conjunction with a normal type relay having a single operating coil. As shown in Fig. 1A terminals A and C are connected to the ends of the primary winding of a transformer 61 which has a centre-tapped secondary winding. The two outside ends of the secondary winding are connected to metal rectifiers 63 and 64, the other terminals of which are connected to resistor-capacitor combinations 65, 67 and 66, 68. Between the centre-tapping of the secondary winding of transformer 61 and the centre point of resistor-capacitor combinations 65, 67, 66, 68 is connected the secondary winding of a transformer 62, the primary winding of which is connected between terminals B and C. The coil of a relay 69 is connected across the series combination of capacitors 67, 68, and its normally closed contacts are connected to terminals D and C. The output of oscillator 14 is connected between terminals B and C and as a result of the rectifying action of metal rectifiers 63 and 64 produces equal and opposite charges across the two capacitors 67 and 68 and consequently does not by itself operate relay 69. When the test signal from amplifier 8 is present between terminal A and terminal C a voltage having a magnitude dependent on the magnitude of this test signal, and a polarity dependent on its phase sense relative to the output of the generator 14 appears across relay D. The arrangement is such that when the amplifier 8 is functioning normally, the voltage across the coil of relay 69 is sufficient to open the contacts.

Figure 2:
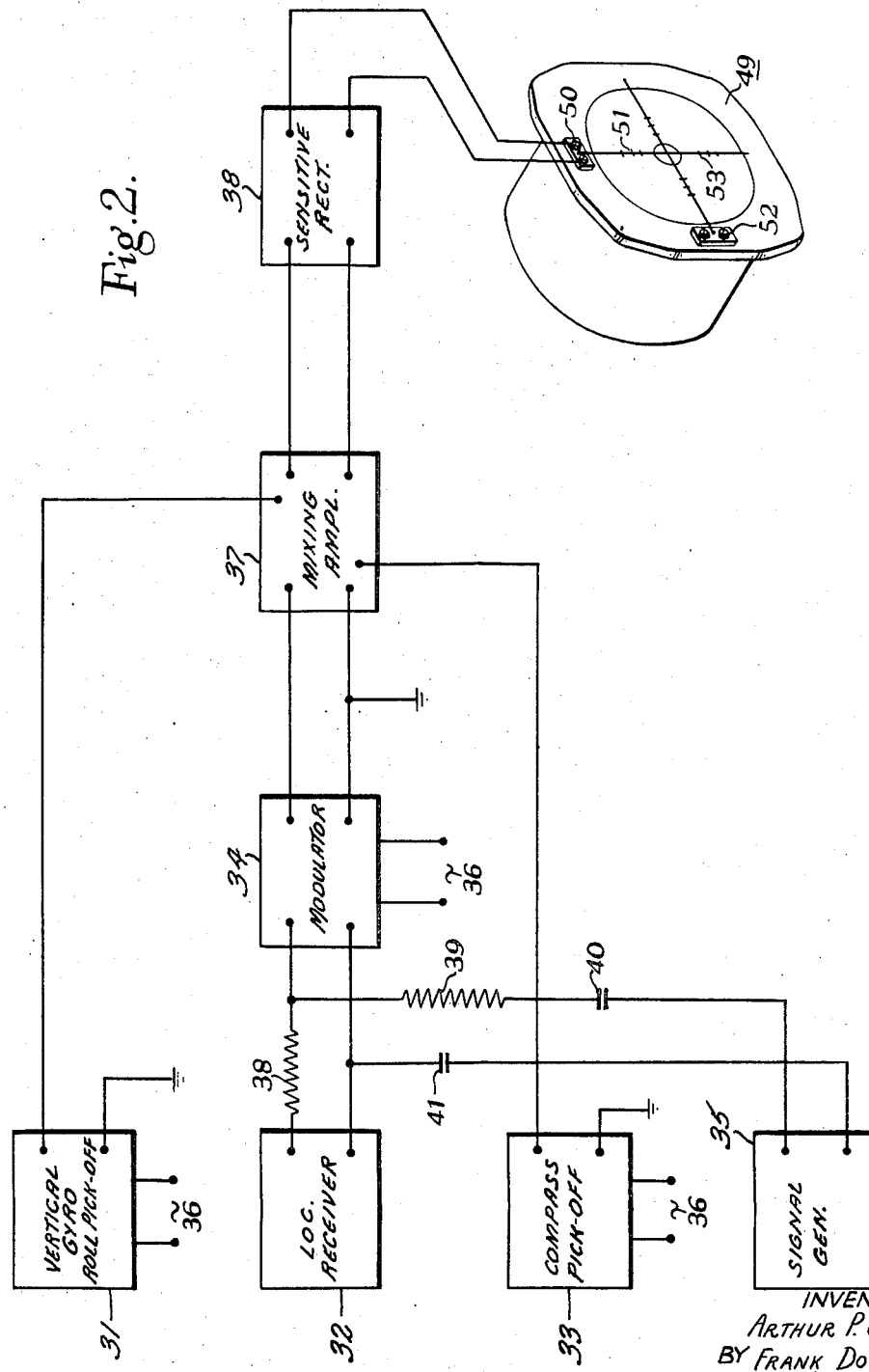
Fig. 2 shows an embodiment of the invention as applied to navigational apparatus for aircraft.

In the embodiment of the invention shown in Figure 2, as applied to part of a navigation system for an aircraft, the vertical pointer 51 of a centre-zero indicator 49 is operated in accordance with a control quantity that is compounded from a number of component control quantities provided by control devices 31, 32 and 33, in such a way that the pointer is in its zero or central position when the aircraft is on a required flight path or when the pilot has taken the action necessary to return the craft to its flight path. The control devices comprise the roll pick-off of a gyro vertical indicated at 31, a localiser receiver indicated at 32 and the pick-off of an azimuth gyroscope indicated at 33. The pick-offs 31 and 33 are energised from a source of 400 c./s. supply 36 and their outputs consist of voltages alternating at 400 c./s., the amplitudes and phase senses of which depend on the magnitude and sense of the control quantities that measure deviation of the aircraft from a predetermined bank angle and a predetermined azimuthal direction respectively. The output of the localiser receiver 32 is a D.C. voltage whose magnitude and polarity indicates departure of the aircraft in magnitude and sense from a predetermined flight path. This D.C. voltage is fed to a modulator 34 which is also connected to the 400 c./s. supply 36 so that the output of the modulator comprises a voltage alternating at 400 c./s. per second having a magnitude and phase sense dependent on the magnitude and sense of departure of the craft from the flight path. These three signals are mixed in a mixing amplifier 37 which may be of any known kind suitable for receiving three alternating voltages as inputs and providing as an output an alternating voltage whose instantaneous value at any time is proportional to the algebraic sum of the instantaneous values of the three inputs. The output of this mixing amplifier is fed to a phase-sense-sensitive rectifier 38 which consequently provides a D.C. voltage output dependent in magnitude and polarity on the algebraic sum of the various control quantities supplied to the mixing amplifier 37. The output of phase-sense-sensitive rectifier 38 is fed to one of the operating coils 50 of a crossed-pointer centre-zero indicating instrument 49 in such a way that the pointer 51 is in its central or zero position when the algebraic sum of the control quantities provided by the control devices 31, 32 and 33 is zero, indicating that the aircraft is following the desired path.

According to the invention, an additional input is provided to the modulator 34 from a signal generator 35. The generator may be an oscillator or a pulse generator having an operating frequency of approximately 10 c./s. per second. Its output terminals are connected to the modulator 34 through capacitors 40 and 41 and resistor 39 in such a way that its output circuit will not affect the D.C. voltage provided by the localiser receiver 32. The signal supplied to the modulator by the signal generator 35 must not contain any D.C. component and for this reason the oscillations and pulses should be symmetrical about the gear axis. The output of modulator 34 will thus be a 400 c./s. voltage modulated not only by the D.C. output of the localiser 32 but also by the A.C. or pulse output of the signal generator 35. The 10 c./s. per second signal will be amplified in mixing amplifier 37 and will appear after demodulation at the output terminals of phase-sense-sensitive rectifier 38. It is then supplied direct to the operating coil 50 of the indicator 49 together with the control signal. Consequently pointer 51 will oscillate about the position to which it is moved by the control signal. As a result of the mechanical damping and the inertia of pointer 51 the amplitude of these oscillations will be comparatively small so that a slight trembling motion is imparted to the pointer which gives it a blurred or fuzzy appearance to visual operation. As this effect is superimposed on any deflection that may be imparted to the pointer by the control signal, the pilot is able to read the deflections of the needle and to control the craft in response to such deflections in spite of the presence of the test signal, and as the test signal has no D.C. component, the position about which the pointer is oscillated is the same as that which it assumes when no test signal is used.

Figure 3:
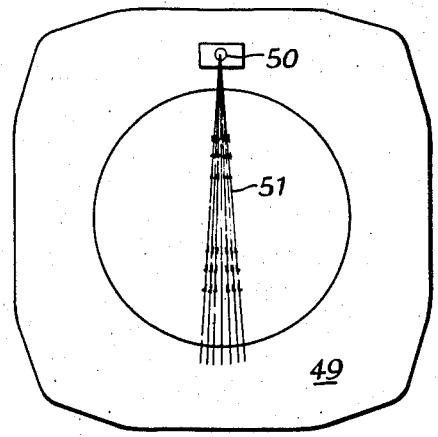
Figs. 3 and 4 are representations of an indicator used in the apparatus of Fig. 2 showing diagrammatically the indication produced when the apparatus is functioning correctly and incorrectly respectively.
Figure 4:
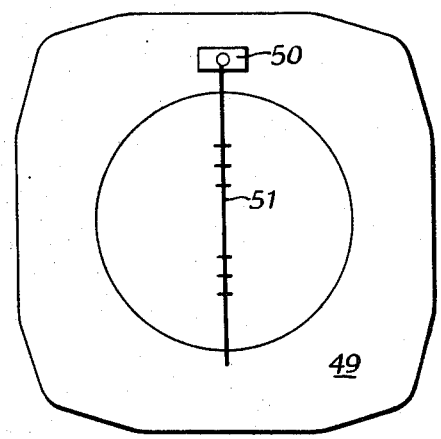

When the pointer is in the zero position because the aircraft is on the desired course, it will have the appearance indicated in Fig. 3. On the other hand when the pointer is in the zero position because the control signals are not being received by the indicator, it will have the appearance indicated in Fig. 4 and the pilot will know that he must not rely on the indications produced by the system.

What is claimed is:

1. In combination with indicating apparatus for aircraft having an indicator adapted to be controlled in dependence upon a control signal representative of an error in a flight condition of the aircraft from a desired flight condition, said control signal comprising a suppressed-carrier modulated alternating voltage having D.C. components varying in accordance with said error and said indicator including a meter having a pointer displaceable over a scale in an amount depending upon the magnitude and polarity of the D.C. component of said control signal, a signal transmission channel for transmitting said control signal to said indicator, said signal transmission channel including receiver means for supplying the demodulation components of said control signal to said meter, means for supplying an auxiliary test signal to said transmission channel to be transmitted to said indicator simultaneously with said control signal through said transmission channel, said test signal comprising an alternating voltage having a frequency and amplitude so correlated to the mass of said pointer as to produce a visible oscillation of said pointer in response thereto, whereby to produce a quiver of said pointer for all displacements thereof produced by the D.C. components of said control signal.

2. An aircraft instrument system including an indicator having a pointer displaceable from a reference position for providing to the pilot a visual indication of a measured quantity, means for producing a control signal varying in accordance with changes in said quantity, a signal transmission channel connected to receive said control signal and to displace said indicator from said reference position in accordance therewith, a source of periodically varying test signal of a frequency and a magnitude sufficient to produce a small but readily discernible oscillation of the pointer of said indicator independent from the movement of said pointer in response to said control signal, said test signal source being so connected with said signal transmission channel that the control signal and the test signal both pass through said channel to produce a discernible oscillation of said pointer in response to said test signal and a displacement thereof in response to said control signal whereby simultaneously to supply both an indication of the measured quantity and an indication as to the operativeness or lack of operativeness of said system.

References Cited in the file of this patent

UNITED STATES PATENTS

| | | |
|---|---|---|
| 1,087,189 | Schweitzer | Feb. 17, 1914 |
| 1,522,581 | Espenschied | Jan. 13, 1925 |
| 1,573,801 | Bown | Feb. 23, 1926 |
| 1,723,220 | Thorp | Aug. 6, 1929 |
| 1,872,257 | Durkee | Aug. 16, 1932 |
| 2,039,765 | Beetem | May 5, 1936 |
| 2,084,995 | Barbulesco | June 29, 1937 |
| 2,137,349 | Rezos | Nov. 22, 1938 |
| 2,164,161 | Nekolny | June 27, 1939 |
| 2,244,725 | Peterson | June 10, 1941 |
| 2,340,590 | Hennig | Feb. 1, 1944 |
| 2,421,081 | O'Brien | May 27, 1947 |
| 2,477,028 | Wilkie | July 26, 1949 |
| 2,478,734 | Abraham | Aug. 9, 1949 |
| 2,685,684 | Atkinson et al. | Aug. 3, 1954 |

FOREIGN PATENTS

| | | |
|---|---|---|
| 574,340 | Great Britain | Jan. 1, 1946 |